United States Patent
Park et al.

(10) Patent No.: US 7,571,783 B2
(45) Date of Patent: Aug. 11, 2009

(54) MOUNTING STRUCTURE OF AN ENDLESS TRACK CARRIER ROLLER

(75) Inventors: Kyung Hyun Park, Changwon (KR); Jin Woo Lee, Kimhae (KR)

(73) Assignee: Volvo Construction Equipment Holding Sweden AB, Eskilstuna (SE)

( * ) Notice: Subject to any disclaimer, the term of this patent is extended or adjusted under 35 U.S.C. 154(b) by 190 days.

(21) Appl. No.: 11/510,776

(22) Filed: Aug. 25, 2006

(65) Prior Publication Data

US 2007/0131460 A1    Jun. 14, 2007

(30) Foreign Application Priority Data

Dec. 13, 2005    (KR) .................. 10-2005-0122416

(51) Int. Cl.
*B62D 55/14*    (2006.01)
(52) U.S. Cl. .................. 180/9.1; 305/132; 305/139
(58) Field of Classification Search .................. 180/9.1, 180/9.52; 305/131, 130, 132, 138, 139
See application file for complete search history.

(56) References Cited

U.S. PATENT DOCUMENTS 2,189,160 A * 2/1940 Baker et al. .................. 305/138
2005/0145422 A1    7/2005 Loegering et al.

FOREIGN PATENT DOCUMENTS

JP    09-104372    4/1997

OTHER PUBLICATIONS

Patent Abstracts of Japan of JP 09-104372 dated Apr. 22, 1997.

* cited by examiner

*Primary Examiner*—Anne Marie M Boehler
(74) *Attorney, Agent, or Firm*—Ladas & Parry LLP

(57) ABSTRACT

Disclosed is a mounting structure of a carrier roller that can decrease vibration occurred in an endless track chain assembly because a location of a carrier roller installed on a lower frame can be controlled. According to the present invention, the mounting structure of the carrier roller is a mounting structure of a carrier roller installed on a lower frame for supporting an upper side of an endless track chain assembly. Further, the mounting structure of the carrier roller includes a mounting part installed on the lower frame, a support part coupled to the mounting part so as to enable its location to be controlled, and a carrier roller coupled to the support part for supporting the endless track chain assembly.

6 Claims, 5 Drawing Sheets

MOUNTING STRUCTURE OF AN ENDLESS TRACK CARRIER ROLLER

CROSS-REFERENCE TO RELATED APPLICATION

This application is based on and claims priority to Korean Patent Application No. 2005-122416 filed on Dec. 13, 2005 in the Korean Intellectual Property Office (KIPO), the entire contents of which are hereby incorporated by reference.

BACKGROUND OF THE INVENTION

1. Field of the Invention

The present invention generally relates to the field of a mounting structure of an endless track carrier roller, and more particularly to a mounting structure of a carrier roller that can reduce vibration occurred by an endless track chain assembly by controlling a position of a carrier roller installed on a lower frame.

2. Description of the Prior Art

FIG. 1 is a side diagram illustrating an undercarriage of tracked-type heavy construction equipment according to the prior art.

The undercarriage includes an endless track chain assembly 1 that runs in a loop over a drive sprocket 6 and an idler wheel 7. The endless track chain assembly 1 is constituted by connecting a plurality of track shoes in chain shape. Further, the undercarriage includes at least one carrier roller 4 for supporting the weight of the endless track chain assembly 1 so that an upper side of the endless track chain assembly 1 is not sunk, and a plurality of track rollers 8 that are rotatably mounted onto a bottom side between the sprocket 6 and the idler 7 so as to distribute the weight of the heavy construction equipment over the ground.

The endless track chain assembly 1 includes components such as a track pin, a track busing, a track link, and others, which are connected in the chain shape. If the endless track chain assembly 1 whose constant tension is continuously kept is used for a long time, abrasion may occur to each part of the components.

In a design of the endless track chain assembly 1, the carrier roller 4 is mounted on a location that a distance between the carrier roller 4 and the sprocket 6 is adjusted with the pitch of a track link. However, if the endless track chain assembly 1 is used for a long time, the abrasion occurs in the components such as the track link, the track bushing and the track pin, and thus the track link pitch is also increased. As a result thereof, track bouncing of the endless track chain assembly 1 may be severely increased. The track bouncing is a phenomenon that the endless track chain assembly 1 is severely vibrated.

FIG. 2 is a perspective diagram illustrating a mounting structure of an endless track carrier roller according to the prior art.

Referring to FIG. 2, the carrier roller 4 is fixed to a lower frame 2 by a bracket 3. Since the bracket 3 is fixed at a predetermined location of the lower frame 2 by welding, the carrier roller 4 can not control it's own location for the lower frame 2 and the endless track chain assembly 1 after mounting once. Accordingly, although the components are worn down by using the endless track chain assembly 1 for a long time and thus the track link pitch is increased, the mounting location of the carrier roller 4 may not be controlled according to the increased track link pitch. Consequently, there is a problem that proper repairs according to equipment aging may not be carried out.

Even when the equipment is manufactured, the distance between the carrier roller 4 and the sprocket 6 may not be finely controlled considering the track link pitch after the bracket 3 for supporting the carrier roller 4 is fixed on the lower frame 2. Accordingly, it is difficult to precisely mount the endless track chain assembly 1.

SUMMARY OF THE INVENTION

An object of the present invention is to provide a mounting structure of a carrier roller, which can stably support an endless track chain assembly.

Another object of the present invention is to provide a mounting structure of a carrier roller, which can control a mounting location of a carrier roller for a lower frame and an endless track chain assembly, thereby allowing the mounting location of the carrier roller to be finely controlled considering a track link pitch.

Still another object of the present invention is to provide a mounting structure of a carrier roller, which can easily control a mounting location of a carrier roller even when the track link pitch is varied by abrasion in each component of an endless track chain assembly, thereby reducing vibration caused by the endless track chain assembly.

According to an aspect of the present invention, there is provided a mounting structure of a carrier roller provided on a lower frame for supporting an upper side of an endless track chain assembly, comprising a mounting part provided on the lower frame, a support part coupled to the mounting part so as to enable a location of the carrier roller to be controlled, and a carrier roller coupled to the support part for supporting the endless track chain assembly.

Preferably, a length hole is formed in the support part, and the support part is coupled to the mounting part by a bolt that is coupled to a bolt hole formed in the mounting part by penetrating the length hole.

Preferably, a length hole is formed in the support part, and a fixing pin, of which the outside forms a screw surface, is installed on the mounting part so that the support part may be coupled to the mounting part by a fixing nut that is coupled to the fixing pin, the fixing pin penetrating the length hole so as to be protruded in an upper side direction of the length hole.

Preferably, the mounting part may be installed on the lower frame by welding or bolt fixing.

According to another aspect of the present invention, there is provided a mounting structure of a carrier roller installed on a lower frame for supporting an upper side of an endless track chain assembly, comprising a bracket installed on the lower frame so as to enable a mounting location of the carrier roller to be controlled, and a carrier roller coupled to the bracket for supporting the endless track chain assembly.

Preferably, a length hole is formed in the bracket, and the bracket is installed on the lower frame using a bolt that is coupled to a bolt hole of the lower frame by penetrating the length hole.

The present invention will not be limited to the technical objects described above. Other objects not described herein will be more definitely understood by those skilled in the art from the following detailed description.

BRIEF DESCRIPTION OF THE DRAWINGS

Example embodiments of the present invention will become more apparent by describing in detail example embodiments of the present invention with reference to the accompanying drawings, in which.

DETAILED DESCRIPTION OF THE PREFERRED EMBODIMENTS

Figure 1:
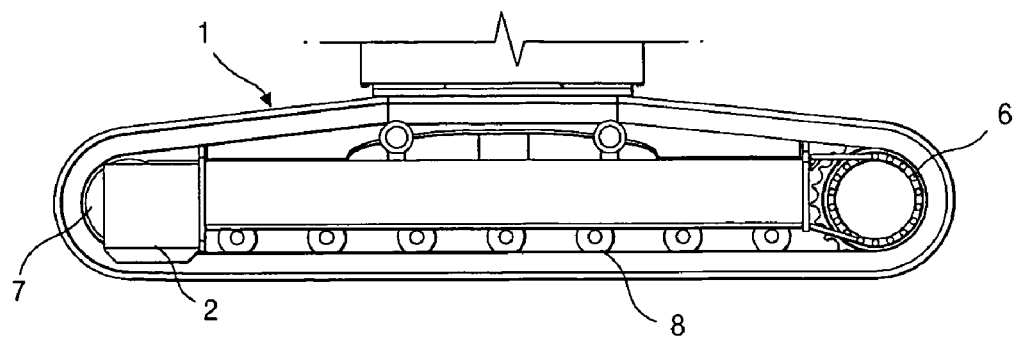
FIG. 1 is a side diagram illustrating an undercarriage of tracked-type heavy construction equipment according to the prior art.
Figure 2:
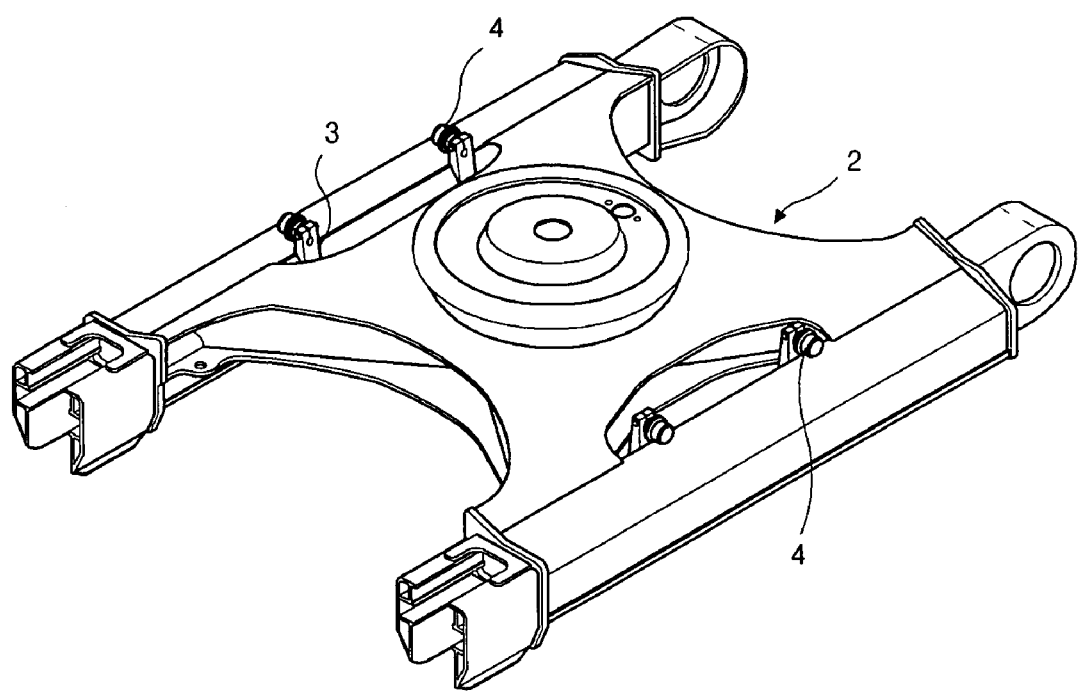
FIG. 2 is a perspective diagram illustrating a mounting structure of a carrier roller according to the prior art.

Subject matters and features of the exemplary embodiments of the present invention will be covered by the detailed description and drawings.

Advantages and features of the present invention and methods of accomplishing the same may be understood more readily by reference to the following detailed description of the exemplary embodiments and the accompanying drawing. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

Hereinafter, preferred embodiments of the present invention will be described in detail with reference to the accompanying drawing.

Figure 3:
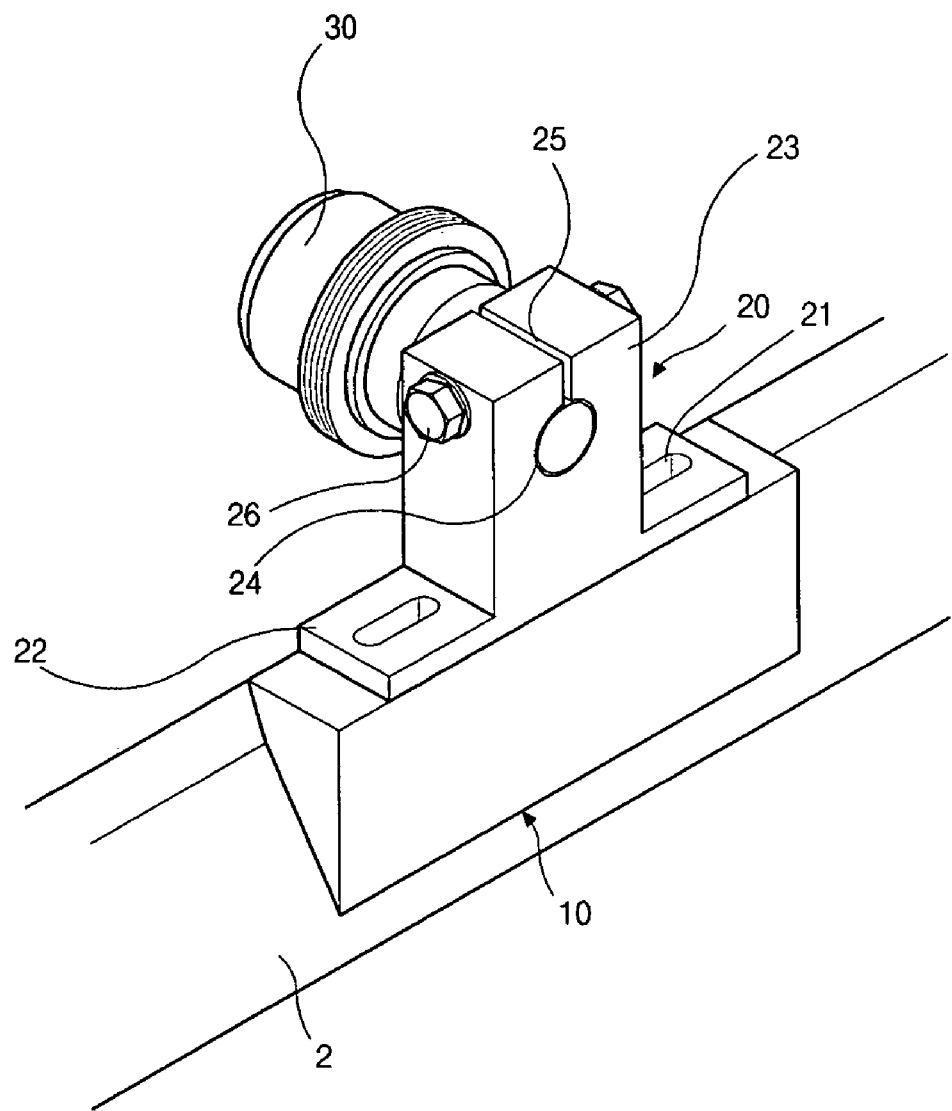
FIG. 3 is a perspective diagram illustrating a mounting structure of a carrier roller according to the first embodiment of the present invention.
Figure 4:
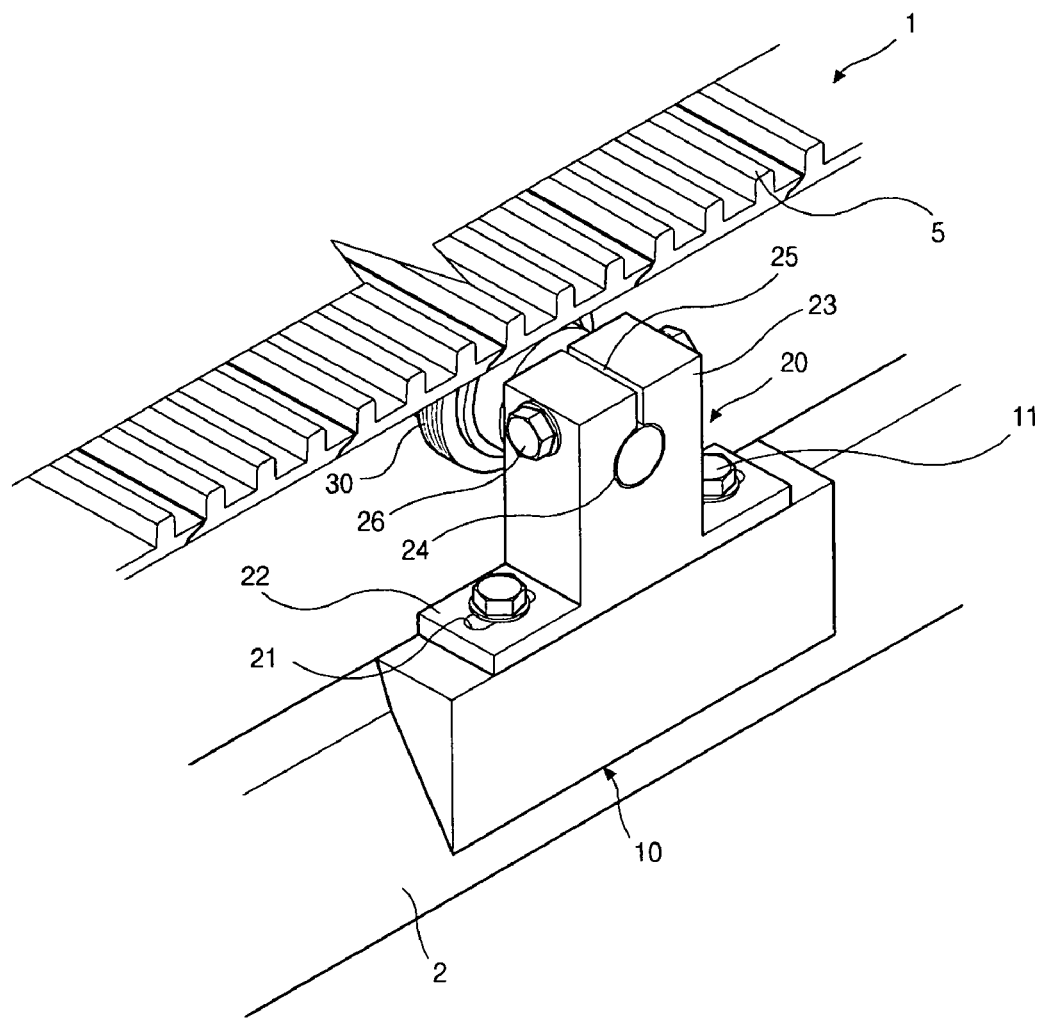
FIG. 4 is a diagram illustrating a practical use state of a carrier roller according to the first embodiment of the present invention.

FIG. 3 is a perspective diagram illustrating a mounting structure of a carrier roller according to a first embodiment of the present invention, and FIG. 4 is a diagram illustrating a practical use state of a carrier roller according to the first embodiment of the present invention.

According to the first embodiment of the present invention, the carrier roller installed on a lower frame 2 supports an upper side of an endless track chain assembly 1.

The endless track chain assembly 1 is constituted of an assembly consisting of a plurality of track shoes 5 and a plurality of track links so as to be installed on the lower frame 2. Further, the endless track chain assembly 1 performs a function that moves heavy construction equipment onward by rotating itself. The endless track chain assembly 1 engages a sprocket 6 and is supported by an idler 7 that is freely rotated, so as to be rotated by receiving a driving power from the sprocket 6. A track roller 8 is installed between the sprocket 6 and the idler 7 so as to be freely rotated, and uniformly distributes the weight of the equipment over the ground. A carrier roller 30 supports the weight of the endless track chain assembly 1 so that an upper side of the endless track chain assembly 1 is not sunk. Although the sprocket, the track roller and the idler are not shown in FIG. 3, they are identical to those shown in FIG. 1.

According to the first exemplary embodiment of the present invention, a mounting structure of a carrier roller includes a mounting part 10, a support part 20 and a carrier roller 30. The mounting part 10 is installed on the lower frame 2, the support part 20 is coupled to the mounting part 10, and the carrier roller 30 is coupled to the support part 20.

The mounting part 10 is fixed to the upper side of the lower frame 2 by welding in order to stably support the support part 20. Although not shown in the drawings, the mounting part 10 may be also coupled by a bolt. In other words, a fixing bolt hole is formed on the upper side of the lower frame 2. The mounting part 10 forms a penetration hole corresponding to the fixing bolt hole. The mounting part 10 may be fixed to the lower frame 2 by a fixing bolt that is coupled to the fixing bolt hole by penetrating the penetration hole.

The support part 20 is coupled to the mounting part 10 so as to enable a location of the mounting part 10 to be controlled, and supports the rear of the carrier roller 30.

Both sides of a bottom of the support part 20 are provided with a wing part 22. The support part 10 is coupled to the mounting part 10 at a state where a bottom side of the wing part 22 is attached to an upper side of the mounting part 10. The wing part 22 is provided with a length hole, which is formed by extending in rotational direction of the endless track chain assembly, so as to be penetrated in up/down directions. The length hole 21 formed in the wing part 22 in the rotational direction of the endless track chain assembly 1 is provided to control the location of the support part 20, which is installed on the mounting part 10, when the support part 20 is coupled to the mounting part 10.

Further, the support part 20 includes a support block 23 extended in an up direction from the mounting wing part 22 and a carrier roller support hole 24 formed in the support block 23. The carrier roller support hole 24 is coupled to the rear of the carrier roller 30 in order to support the carrier roller 30. One side of the carrier roller support hole 24 is connected to a tension control groove 25. The tension control groove 25 is extended to the outside of the support part 20 and is opened. The support block 23 is provided with a carrier roller fixing bolt 26 across the tension control groove 25. When the carrier roller fixing bolt 26 is coupled to the support block 23, a gab of the tension control groove 25 is decreased by a tension caused by the carrier roller fixing bolt 26, thereby allowing the carrier roller support hole 24 to stably support the carrier roller 30.

The support 20 is coupled to the mounting part 10 by a bolt 11 that is screw-coupled to a bolt hole (not shown) of the mounting part 10 through the length hole 21. Thus, a location of the support part 20 is controlled for the mounting part 10, so that a mounting location of the carrier roller 30 may be controlled for the lower frame 2.

Figure 5:
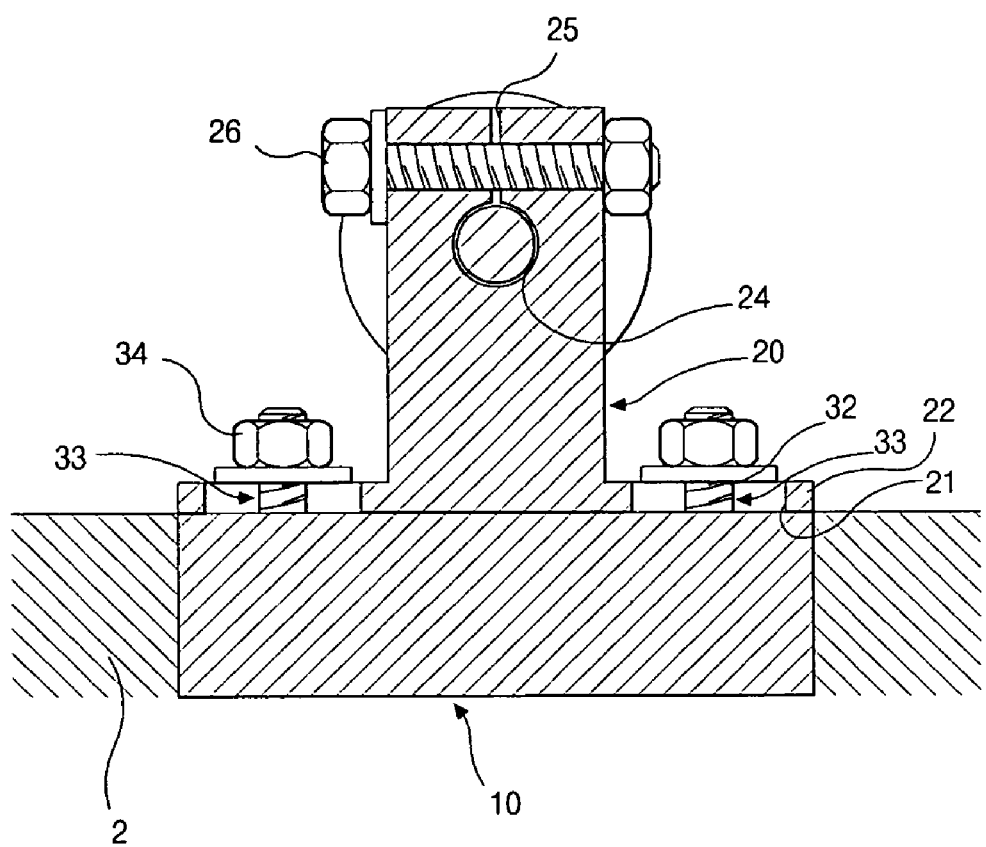
FIG. 5 is a side sectional diagram illustrating a mounting structure of an endless track a carrier roller according to a second embodiment of the present invention.

FIG. 5 is a side sectional diagram illustrating a mounting structure of a carrier roller according to a second embodiment of the present invention.

As shown, the second embodiment of the present invention is identical to the first embodiment of the present invention, except that the support part 20 is coupled to the mounting part 10 using a fixing pin 33 installed on the mounting part 10.

The length hole 21 formed in the support part 20 can control a location for the mounting part 10 when the support part 20 is installed on the mounting part 10. The mounting part 10 and the support part 20 are coupled to each other by the fixing pin 33 and a fixing nut 34. The fixing pin 33 is provided on an upper side of the mounting part 10 and is extended so as to be protruded by a predetermined length in the upper side direction of the length hole 21 after penetrating the length hole 21 of the support part 20. The outside of the fixing pin 33 forms a screw surface 32 so as to enable the fixing nut 34 to be coupled to the fixing pin 33.

When the support part 20 is coupled to the mounting part 10, the length hole 21 of the support part 21 is inserted into the fixing pin 33 of the mounting part 10 and keeps the fixing nut 34 onto an upper surface of the mounting part 10. Then, when the fixing nut 34 is screw-coupled to an upper end of the fixing pin 33 that is protruded in the upper side direction of the length hole 21, the support part 20 is stably coupled to the mounting part 10. Before tightly fastening the fixing nut 34 screw-coupled to the fixing pin 33, the location of the support part 20 is controlled for the mounting part 10 in consideration of the total design of the endless track chain assembly 1 so as to enable the location of the carrier roller 30 to be correctly established.

Since components such as the carrier roller support hole 24, the tension control groove 25 and the carrier roller fixing bolt 26, each of which is formed in the support part 20, are identical to those of the first embodiment of the present invention, the repetitive explanation will be omitted.

Figure 6:
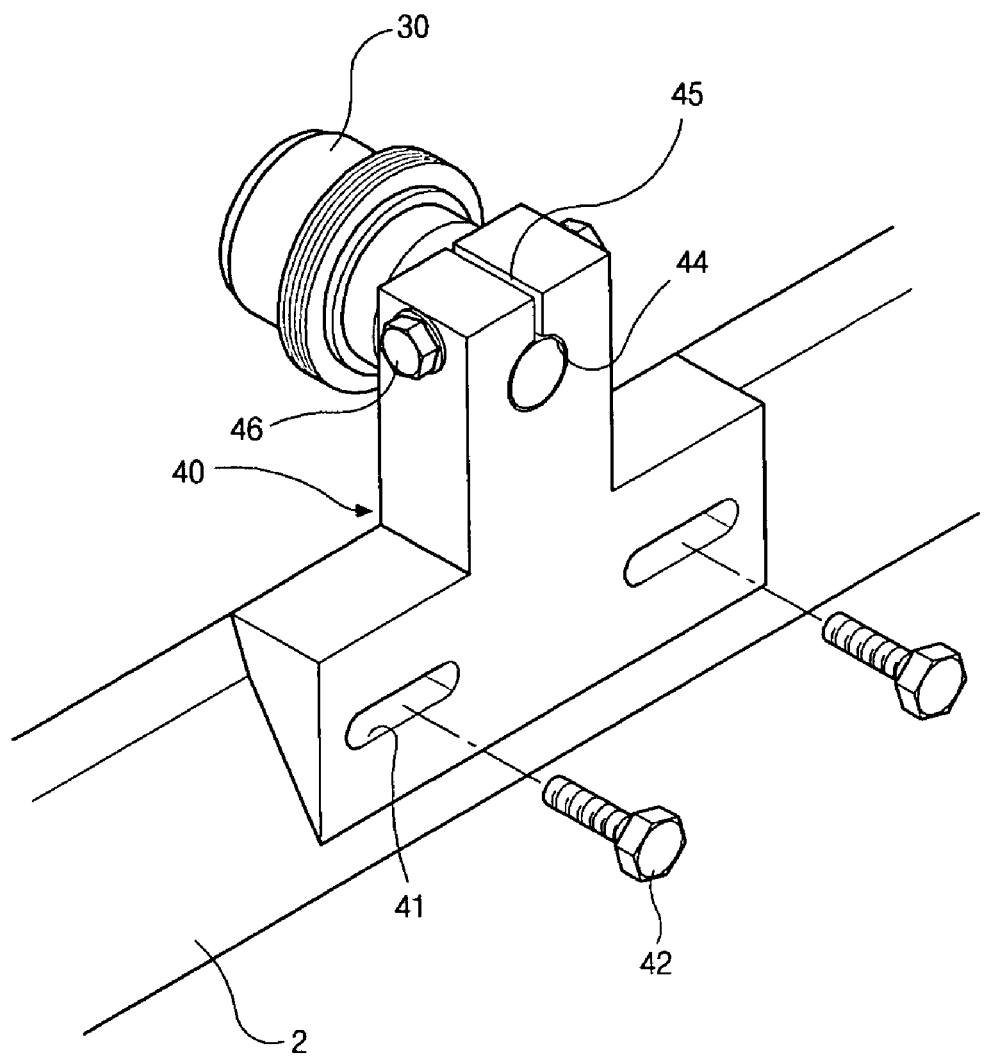
FIG. 6 is a perspective diagram illustrating a mounting structure of a carrier roller according to a third embodiment of the present invention.

FIG. 6 is a perspective diagram illustrating a mounting structure of a carrier roller according to a third embodiment of the present invention.

The third embodiment of the present invention is identical to the first and second embodiments of the present invention, except that the carrier roller 30 is installed on the lower frame 2 by a bracket 40, the bracket 40 being directly installed on the lower frame 2.

The mounting structure of a carrier roller according to the third embodiment includes the bracket 40 installed on the lower frame 2, and the carrier roller 30 supported by the bracket 40.

The bracket 40 can control an installation location for the lower frame 2. In order to control the installation location, the bracket 40 is provided with a length hole 41 that is extended in a rotational direction of the endless track chain assembly 1. A bolt hole (not shown) is formed in a location corresponding to the length hole 41 of a portion contacting with the bracket 40 of the lower frame 2. Accordingly, the bolt 42 penetrates the length hole 41 so as to be coupled to the bolt hole (not shown), and thus the bracket 40 is installed on the lower frame 2.

When the bracket 40 is installed on the lower frame 2, the bolt 42 penetrates the length hole 41 and is screw-coupled to the bolt hole (not shown), after the bolt hole (not shown) of the lower frame and the length hole 41 are corresponded. The location of the bracket 40 on the lower frame 2 is finely controlled before perfectly fastening the bolt 42, thereby allowing an installation location of the carrier roller 30 to be exactly established.

Since components such as a carrier roller support hole 44, a tension control groove 45 and the carrier roller fixing bolt 46, each of which is formed on an upper side, are identical to those of the first embodiment of the present invention, the repetitive explanation will be omitted.

When the heavy construction equipment is firstly manufactured, the installation location of the carrier roller 30 on the endless track chain assembly 1 and the sprocket can be exactly established by finely controlling the support part 20 and the bracket 40 using the components. Further, even after driving the heavy construction equipment for a long time, the installation location of the carrier roller 30 can be controlled by unfastening the bolts 11 and 42.

As described above, according to the mounting structure of the carrier roller of the present invention, even when each component of the endless track chain assembly is worn out, the location of the carrier roller installed on the lower frame is easily controlled, thereby allowing vibration resulting in the endless track chain assembly to be reduced.

It should be understood by those of ordinary skill in the art that various replacements, modifications and changes in the form and details may be made therein without departing from the sprit and scope of the present invention as defined by the following claims. Therefore, it is to be appreciated that the above described embodiments are for purpose of illustration only and are not to be construed as limitations of the invention.

What is claimed is:

1. A mounting structure of an endless track carrier roller installed on a lower frame for supporting an upper side of an endless track chain assembly, comprising:
   a mounting part installed on the lower frame;
   a support part, coupled to the mounting part, configured to enable its own location to be controlled; and
   a carrier roller, coupled to the support part, configured to support the endless track chain assembly,
   wherein the support part comprises a wing part coupled to the mounting part and a support block extended in an upward direction from the mounting part, the wing part including an elongated hole for coupling to the mounting part by a bolt and to control the location of the support part, the support block including a carrier support hole and a tension control groove extended from the carrier support hole to the outside of the support block for allowing the carrier support hole to stably support the carrier roller through a tension.

2. The mounting structure of claim 1, wherein
   the support part is provided with the elongated hole,
   the mounting part is provided with a fixing pin having an outside that forms a screw surface, the fixing pin penetrating the elongated hole so as to be protruded in an upper direction of the elongated hole, and
   the support part is coupled to the mounting part by a fixing nut coupled to the fixing pin.

3. The mounting structure as claimed in claim 2, wherein the mounting part is installed on the lower frame by welding.

4. The mounting structure as claimed in claim 2, wherein the mounting part is installed on the lower frame by a bolt.

5. The mounting structure as claimed in claim 1, wherein the mounting part is installed on the lower frame by welding.

6. The mounting structure as claimed in claim 1, wherein the mounting part is installed on the lower frame by a bolt.

\* \* \* \* \*